(12) United States Patent
Gilmore et al.

(10) Patent No.: US 9,481,810 B2
(45) Date of Patent: Nov. 1, 2016

(54) SILYLATED POLYARYLENES

(71) Applicants: Rohm and Haas Electronic Materials LLC, Marlborough, MA (US); Rohm and Haas Electronic Materials Korea Ltd., Chungcheonghan-do (KR)

(72) Inventors: Christopher D. Gilmore, Watertown, MA (US); Ping Ding, Acton, MA (US); Young Seok Kim, Shrewsbury, MA (US); Tae Hwan Kim, Chungcheongnam-do (KR)

(73) Assignee: Rohm and Haas Electronic Materials LLC, Marlborough, MA (US)

( * ) Notice: Subject to any disclaimer, the term of this patent is extended or adjusted under 35 U.S.C. 154(b) by 86 days.

(21) Appl. No.: 14/569,811

(22) Filed: Dec. 15, 2014

(65) Prior Publication Data
US 2016/0168419 A1   Jun. 16, 2016

(51) Int. Cl.
*C08G 65/26* (2006.01)
*C09D 183/16* (2006.01)
*C08G 61/10* (2006.01)
*C08G 61/12* (2006.01)
*C09D 165/02* (2006.01)
*C08L 65/02* (2006.01)

(52) U.S. Cl.
CPC ............ *C09D 183/16* (2013.01); *C08G 61/10* (2013.01); *C08G 61/12* (2013.01); *C08G 65/2639* (2013.01); *C08L 65/02* (2013.01); *C09D 165/02* (2013.01); *C08G 2261/135* (2013.01); *C08G 2261/312* (2013.01); *C08G 2261/344* (2013.01); *C08G 2261/364* (2013.01); *C08G 2261/46* (2013.01); *C08G 2261/74* (2013.01); *C08G 2261/76* (2013.01); *C08G 2261/80* (2013.01)

(58) Field of Classification Search
CPC ...................................................... C08G 65/26
USPC ............................... 528/25; 524/588; 427/58
See application file for complete search history.

(56) References Cited

U.S. PATENT DOCUMENTS

| 5,965,679 | A | 10/1999 | Godschalx et al. |
| 6,184,284 | B1 | 2/2001 | Stokich, Jr. et al. |
| 6,288,188 | B1 | 9/2001 | Godschalx et al. |
| 6,559,215 | B2 | 5/2003 | Mills et al. |
| 6,646,081 | B2 | 11/2003 | Godschlax et al. |
| 6,800,381 | B2 * | 10/2004 | Cho ............ C08G 73/10 313/504 |
| 2005/0014855 | A1 | 1/2005 | Bruza et al. |

FOREIGN PATENT DOCUMENTS

| JP | 3928263 B2 | 6/2007 |
| WO | 9710193 A1 | 3/1997 |
| WO | 0040637 A1 | 7/2000 |
| WO | 2004073824 A2 | 9/2004 |

OTHER PUBLICATIONS

Boydston, et al, "A controlled, iterative synthesis and the electronic properties of oligo[(p-phenyleneethynylene)-alt-(2,5, siloleneethynylene)]s," J. Am. Chem., 2004, pp. 10350-10354, vol. 126, No. 33.
Search report for corresponding Taiwan Application No. 104141371 dated May 9, 2016.

* cited by examiner

*Primary Examiner* — Duc Truong
(74) *Attorney, Agent, or Firm* — S. Matthew Cairns

(57) ABSTRACT

Polyarylenes comprising as polymerized units a first monomer having two cyclopentadienone moieties and a second monomer having two or more alkyne moieties, wherein at least one alkyne moiety is directly bonded to a silicon atom are provided. Such polyarylenes are useful as dielectric materials in the manufacture of electronic devices.

14 Claims, No Drawings

SILYLATED POLYARYLENES

The present invention relates generally to the field of polyarylene materials, and more specifically to polyarylene materials useful as dielectric materials in the manufacture of electronic devices.

Polymer dielectrics are used as insulating layers in a variety of electronic devices, such as circuit boards. integrated circuits, electronic packages, and the like. One class of polymer dielectrics used in the manufacture of electronic devices is the polyarylenes, and particularly useful are the polyphenylenes. U.S. Pat. No. 5,965,679 discloses polyphenylene polymers prepared by a Diels-Alder reaction of a polyfunctional compound containing two or more cyclopentadienone groups and at least one polyfunctional compound containing two or more aromatic acetylene groups, where at least some of the polyfunctional compounds contain three or more reactive groups. In this patent, "reactive groups" are defined as a cyclopentadienone or acetylene group. Certain of the polyfunctional compounds disclosed in U.S. Pat. No. 5,965,679 may contain a moiety of the general formula -phenyl-Z-phenyl-, where Z is one of a number of possible moieties, including —Si($R^3$)$_2$—, where $R^3$ is H, methyl, ethyl, propyl or phenyl. The polyphenylenes disclosed in U.S. Pat. No. 5,965,679 have limited solubility in solvents typically used in the manufacture of electronic devices, limiting the use of these polyphenylenes. Also, these polyphenylenes are not always readily compatible with other materials used in the manufacture of electronic devices. For example, such polyphenylenes require the use of certain hydrolyzed alkoxysilanes as adhesion promoters to improve the bond strength between a substrate and a layer of these polyphenylene materials, as is disclosed in U.S. Pat. No. 6,184,284. Japanese patent 3928263 B2 discloses polyphenylene polymers that are surface functionalized in the presence of a palladium catalyst after polymerization to provide polyphenylene polymers having its aromatic rings substituted with —C≡C—Z moieties, where Z is hydrogen, aryl, alkyl, halogenated alkyl or trialkylsilyl. These polyphenylene polymers contain a plurality ethynyl moieties, which ethynyl moieties may have a terminal trialkylsilyl group. There remains a need in the art for polyphenylenes having a higher degree of compatibility with other materials and having improved solubility for use as dielectrics in electronic device manufacture.

The present invention provides an arylene oligomer comprising as polymerized units a first monomer having two cyclopentadienone moieties and a second monomer having two or more alkyne moieties, wherein at least one alkyne moiety is directly bonded to a silicon atom.

Also provided by the present invention is a composition comprising the arylene oligomer described above and an organic solvent.

Further, the present invention provides a method of preparing the arylene oligomer described above comprising reacting a first monomer having two cyclopentadienone moieties with a second monomer having two or more alkyne moieties, wherein at least one alkyne moiety is directly bonded to a silicon atom.

The present invention also provides a method of manufacturing an electronic device comprising: providing an electronic device substrate; disposing a layer of the composition described above on the electronic device substrate; and curing the composition to form a cured polyarylene film on the electronic device substrate. An electronic device comprising a polymeric layer formed from the arylene oligomer described above is also provided by the present invention.

As used throughout this specification, the following abbreviations shall have the following meanings, unless the context clearly indicates otherwise: ° C.=degree Celsius; g=gram; L=liter; mL=milliliter; nm=nanometer; µm=micron=micrometer; sec.=second; min=minute; hr.=hour; DI=deionized; rpm=revolutions per minute; Da=Dalton; $M_n$=number average molecular weight; and $M_w$=weight average molecular weight. All amounts are percent by weight ("wt %") and all ratios are molar ratios, unless otherwise noted. All numerical ranges are inclusive and combinable in any order, except where it is clear that such numerical ranges are constrained to add up to 100%.

The articles "a", "an" and "the" refer to the singular and the plural. "Alkyl" refers to linear, branched and cyclic alkyl unless otherwise specified. "Aryl" refers to aromatic carbocycles and aromatic heterocycles. The term "oligomer" refers to dimers, trimers, tetramers and other polymeric materials that are capable of further curing. By the term "curing" is meant any process, such as polymerization or condensation, that increases the molecular weight of a material or composition. "Curable" refers to any material capable of being cured under certain conditions. When an element is referred to as being "disposed on" another element, it can be directly on the other element or intervening elements may be present therebetween. In contrast, when an element is referred to as being "disposed directly on" another element, there are no intervening elements present.

Oligomers of the present invention comprise as polymerized units a first monomer having two cyclopentadienone moieties and a second monomer having two or more alkyne moieties, wherein at least one alkyne moiety is directly bonded to a silicon atom. The oligomers of the present invention are polyarylenes, and preferably are polyphenylenes.

Any monomer containing two cyclopentadienone moieties may suitably be used as the first monomer to prepare the present oligomers. Such monomers are well-known, such as those described in U.S. Pat. Nos. 5,965,679; 6,288,188; and 6,646,081; and in Int. Pat. Pubs. WO 97/10193 and WO 2004/073824. It is preferred that the first monomer has the structure shown in formula (1)

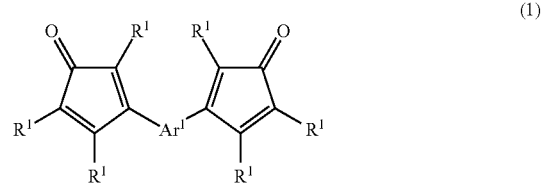

wherein each $R^1$ is independently chosen from H, $C_{1-6}$ alkyl, phenyl, or substituted phenyl; and $Ar^1$ is an aromatic moiety. Preferably, each $R^1$ is independently chosen from $C_{3-6}$ alkyl, phenyl and substituted phenyl, and more preferably each $R^1$ is phenyl. By "substituted phenyl" it is meant a phenyl moiety having one or more of its hydrogens replaced with one or more substituents chosen from halogen, $C_{1-6}$ alkyl, $C_{1-6}$ haloalkyl, $C_{1-6}$ alkoxy, $C_{1-6}$ haloalkoxy, phenyl, and phenoxy, and preferably from halogen, $C_{1-4}$ alkyl, $C_{1-4}$ haloalkyl, $C_{1-4}$ alkoxy, $C_{1-4}$ haloalkoxy, and phenyl. It is preferred that substituted phenyl is a phenyl moiety having one or more of its hydrogens replaced with one or more substituents chosen from halogen, $C_{1-6}$ alkyl, $C_{1-6}$ alkoxy, phenyl, and phenoxy. Preferably, a substituted phenyl has from 1 to 3 substituents, and more preferably 1 or 2 substituents. A wide variety of aromatic moieties are suitable for use as $Ar^1$, such as those disclosed in U.S. Pat. No. 5,965,679. Exemplary aromatic moieties useful for $Ar^1$ include those having the structure shown in formula (2)

 (2)

wherein x is an integer chosen from 1, 2 or 3; y is an integer chosen from 0, 1, or 2; each $Ar^2$ is independently chosen from

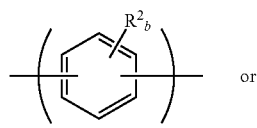 (3)

or

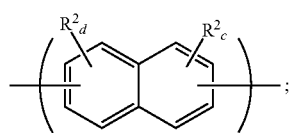 (4)

each $R^2$ is independently chosen from halogen, $C_{1-6}$ alkyl, $C_{1-6}$ haloalkyl, $C_{1-6}$ alkoxy, $C_{1-6}$ haloalkoxy, phenyl, and phenoxy; b is an integer from 0 to 4; each of c and d is an integer from 0 to 3; each Z is independently chosen from O, S, SO, $SO_2$, $NR^3$, $PR^3$, $P(=O)R^3$, $C(=O)$, $CR^4R^5$, and $SiR^4R^5$; $R^3$, $R^4$, and $R^5$ are independently chosen from H, $(C_1-C_4)$alkyl, halo$(C_1-C_4)$alkyl, and phenyl. It is preferred that x is 1 or 2, and more preferably 1. It is preferred that y is 0 or 1, and more preferably 1. Preferably, each $R^2$ is independently chosen from halogen, $C_{1-4}$ alkyl, $C_{1-4}$ haloalkyl, $C_{1-4}$ alkoxy, $C_{1-4}$ haloalkoxy, and phenyl, and more preferably from fluoro, $C_{1-4}$ alkyl, $C_{1-4}$ fluoroalkyl, $C_{1-4}$ alkoxy, $C_{1-4}$ fluoroalkoxy, and phenyl. It is preferred that b is from 0 to 3, more preferably from 0 to 2, and yet more preferably 0 or 1. It is preferred that c is from 0 to 2, and more preferably from 0 or 1. It is also preferred that d is from 0 to 2, and more preferably 0 or 1. In formula (4), it is preferred that c+d=0 to 4, and more preferably 0 to 2. Each Z is preferably independently chosen from O, S, $NR^3$, $C(=O)$, $CR^4R^5$, and $SiR^4R^5$, more preferably from O, S, $C(=O)$, and $CR^4R^5$, and yet more preferably from O, $C(=O)$, and $CR^4R^5$. It is preferred that each $R^3$, $R^4$, and $R^5$ are independently chosen from H, $C_{1-4}$ alkyl, $C_{1-4}$ fluoroalkyl, and phenyl; and more preferably from H, $C_{1-4}$ alkyl, $C_{1-2}$ fluoroalkyl, and phenyl. Preferably, each $Ar^2$ has the structure (3).

The second monomer useful in preparing the present oligomers has two or more alkyne moieties, wherein at least one alkyne moiety is directly bonded to a silicon atom. Preferably the second monomer is aromatic, and more preferably comprises an aromatic ring substituted with 2 or more alkyne moieties, wherein at least one alkyne moiety is directly bonded to a silicon atom. Suitable second monomers are those of formula (5) and formula (6)

 (5)

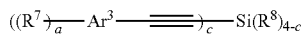 (6)

wherein a is an integer from 0 to 4; b is 2 or 3; c is 2 or 3; each $R^6$ is independently chosen from H, $Si(R^8)_3$, $C_{1-10}$ alkyl, $C_{1-10}$ alkoxy, $C_{7-15}$ aralkyl, $C_{6-10}$ aryl, and substituted $C_{640}$ aryl; each $R^7$ is independently chosen from H, $C_{1-10}$ alkyl, $C_{1-10}$ alkoxy, $C_{7-15}$ aralkyl, $C_{6-10}$ aryl, and substituted $C_{6-10}$ aryl; each $R^8$ is independently chosen from H, halogen, hydroxyl, $C_{1-10}$ alkyl, $C_{1-10}$ alkoxy, $C_{7-15}$ aralkyl, $C_{7-15}$ aralkoxy, $C_{6-10}$ aryl, $C_{6-20}$ aryloxy, and substituted $C_{6-10}$ aryl; and $Ar^3$ is $C_{6-10}$ aryl; provided that at least one $R^6$ is $Si(R^8)_3$. Preferably, each $R^8$ is independently chosen from H, hydroxyl, $C_{1-6}$ alkyl, $C_{1-6}$ alkoxy, $C_{7-12}$ aralkyl, $C_{7-15}$ aralkoxy, $C_{6-10}$ aryl, $C_{6-15}$ aryloxy, and substituted $C_{6-10}$ aryl, and more preferably each $R^8$ is independently chosen from H, hydroxyl, methyl, ethyl, propyl, butyl, methoxy, ethoxy, propoxy, butoxy, phenyl, benzyl, phenethyl, and phenoxy. $Ar^3$ is preferably phenyl or naphthyl, and more preferably phenyl. "Substituted $C_{6-10}$ aryl" refers to any $C_{6-10}$ aryl moiety having one or more of its hydrogens replaced with one or more substituents chosen from halogen, $C_{1-4}$ alkyl, $C_{1-4}$ haloalkyl, $C_{1-4}$ alkoxy, $C_{1-4}$ haloalkoxy, and phenyl, and preferably from $C_{1-3}$ alkyl, $C_{1-3}$ haloalkyl, $C_{1-3}$ alkoxy, $C_{1-3}$ fluoroalkoxy, and phenyl. Fluorine is a preferred halogen. Preferably, the second monomer has the structure of formula (5). Preferred second monomers include 1,3-bis[(trimethylsilyl)ethynyl]benzene, 1,4-bis[(trimethylsilyl)ethynyl]benzene, 1,3,5-tris(trimethylsilylethynyl)benzene, 1,3-bis[(trimethoxysilyl)ethynyl]benzene, 1,4-bis[(trimethoxysilyl)ethynyl]benzene, 1,3-bis[(dimethylmethoxysilyl)ethynyl]benzene, 1,4-bis[(dimethylmethoxysilyl)ethynyl]benzene, 1,3-phenylenebis(ethyne-2,1-diyl))bis(dimethylsilanol), 1,4-phenylenebis(ethyne-2,1-diyl))bis(dimethylsilanol), bis(phenylethynyl)dimethylsilane, and bis(phenylethynyl)dimethoxysilane, and more preferably 1,3-bis[(trimethylsilyl)ethynyl]benzene, 1,4-bis[(trimethylsilyl)ethynyl]benzene, 1,3-bis[(trimethoxysilyl)ethynyl]benzene, 1,4-bis[(trimethoxysilyl)ethynyl]benzene, 1,3-bis[(dimethylmethoxysilyl)ethynyl]benzene, 1,4-bis[(dimethylmethoxysilyl)ethynyl]benzene, 1,3-phenylenebis(ethyne-2,1-diyl))bis(dimethylsilanol), and 1,4-phenylenebis(ethyne-2,1-diyl))bis(dimethylsilanol). Compounds useful as the second monomers may be prepared by a variety of procedures known in the art, or are generally commercially available, such as from Sigma Aldrich (Milwaukee Wis.), TCI America (Portland, Oreg.), or Gelest, Inc. (Tullytown, Pa.).

Optionally, the present oligomers may comprise as polymerized units one or more non-silicon-containing third monomers comprising one or more alkyne moieties. Any suitable non-silicon-containing monomer comprising one or more alkyne moieties may be used as the third monomer. Preferably, the third monomer is an aromatic monomer, and more preferably an aromatic monomer comprising two or more alkyne moieties. Preferred compounds useful as third monomers are those having the formula (7)

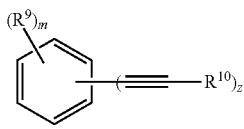

(7)

wherein each $R^9$ is independently chosen from H, $C_{1-10}$ alkyl, $C_{1-10}$ alkoxy, $C_{7-15}$ aralkyl, $C_{6-10}$ aryl, and substituted $C_{6-10}$ aryl; each $R^{10}$ is independently chosen from H and phenyl; m is an integer from 0 to 4; z is an integer from 1 to 3; and m+z≤6. Suitable non-silicon-containing third monomers are those disclosed in U.S. Pat. No. 5,965,679. It will be appreciated by those skilled in the art that the silicon content of the present oligomers may be adjusted by adjusting the amount of the second monomer in conjunction with the use of the optional non-silicon-containing third monomer.

The oligomers of the present invention are prepared by reacting one or more first monomers with one or more second monomers, and any optional third monomers, in a suitable organic solvent. The mole ratio of the total first monomers to the total second monomers is from 2.5:1 to 1:2.5, preferably from 1:2 to 2:1, and more preferably from 1.75:1 to 1:1.75. When an optional third monomer is used, it is typically used in an amount of 0.001 to 0.2 equivalents, based on the first monomer. Suitable organic solvents useful to prepare the present oligomers are benzyl esters of $C_{2-6}$ alkanecarboxylic acids, dibenzyl esters of $C_{2-6}$ alkanedicarboxylic acids, tetrahydrofurfuryl esters of $C_{2-6}$ alkanecarboxylic acids, ditetrahydrofurfuryl esters of $C_{2-6}$ alkanedicarboxylic acids, phenethyl esters of $C_{2-6}$ alkanecarboxylic acids, diphenethyl esters of $C_{2-6}$ alkanedicarboxylic acids, cycloalkanones, and aromatic solvents. Preferred aromatic solvents are aromatic hydrocarbons and aromatic ethers. Suitable aromatic hydrocarbons are mesitylene, p-cymene, xylene, and toluene. Suitable aromatic ethers are diphenyl ether, dibenzyl ether, $C_{1-6}$ alkoxy-substituted benzenes and benzyl $C_{1-6}$ alkyl ethers, and more preferably $C_{1-4}$ alkoxy-substituted benzenes and benzyl $C_{1-4}$ alkyl ethers. Suitable cycloalkanones are cyclopentanone, cyclohexanone, cycloheptanone and cyclooctanone. Preferred organic solvents are benzyl esters of $C_{2-4}$ alkanecarboxylic acids, dibenzyl esters of $C_{2-4}$ alkanedicarboxylic acids, tetrahydrofurfuryl esters of $C_{2-4}$ alkanecarboxylic acids, ditetrahydrofurfuryl esters of $C_{2-4}$ alkanedicarboxylic acids, phenethyl esters of $C_{2-4}$ alkanecarboxylic acids, diphenethyl esters of $C_{2-4}$ alkanedicarboxylic acids, $C_{1-6}$ alkoxy-substituted benzenes, and benzyl $C_{1-6}$ alkyl ethers, more preferably benzyl esters of $C_{2-6}$ alkanecarboxylic acids, tetrahydrofurfuryl esters of $C_{2-6}$ alkanecarboxylic acids, phenethyl esters of $C_{2-6}$ alkanecarboxylic acids, $C_{1-4}$ alkoxy-substituted benzenes, benzyl $C_{1-4}$ alkyl ethers, and dibenzyl ether, and yet more preferably benzyl esters of $C_{2-6}$ alkanecarboxylic acids, tetrahydrofurfuryl esters of $C_{2-6}$ alkanecarboxylic acids, $C_{1-4}$ alkoxy-substituted benzenes, and benzyl $C_{1-4}$ alkyl ethers. Exemplary organic solvents include, without limitation, benzyl acetate, benzyl proprionate, tetrahydrofurfuryl acetate, tetrahydrofurfuryl propionate, tetrahydrofurfuryl butyrate, cyclopentanone, cyclohexanone, cycloheptanone, cyclooctanone, mesitylene, p-cymene, xylene, toluene, anisole, methylanisole, dimethylanisole, dimethoxybenzene, ethylanisole, ethoxybenzene, benzyl methyl ether, and benzyl ethyl ether, and preferably benzyl acetate, benzyl proprionate, tetrahydrofurfuryl acetate, tetrahydrofurfuryl propionate, tetrahydrofurfuryl butyrate, anisole, methylanisole, dimethylanisole, dimethoxybenzene, ethylanisole, and ethoxybenzene.

The oligomers of the present invention may be prepared by combining the first monomer, the second monomer, any optional third monomer, and organic solvent, each as described above, in any order in a vessel, and heating the mixture. The first monomer may first be combined with the organic solvent in a vessel, and the second monomer then added to the mixture. In one embodiment, the first monomer and organic solvent mixture is first heated to the desired reaction temperature before the second monomer is added. The second monomer may be added at one time, or alternatively the second monomer may be added over a period of time, such as from 0.25 to 46 hr., and preferably from 2 to 18 hr., to reduce exotherm formation. The first monomer and organic solvent mixture may first be heated to the desired reaction temperature before the second monomer is added. Alternatively, the first monomer, second monomer and solvent are added to a vessel, and then heated to the desired reaction temperature and held at this temperature for a period of time to provide the desired oligomer. The reaction mixture is heated at a temperature of 95 to 230° C. for a period of time, such as from 8 to 250 hours. Preferably, the mixture is heated to a temperature of 110 to 225° C., more preferably 125 to 225° C., and yet more preferably 150 to 220° C. Optionally, an acid catalyst may be added to the reaction in order to speed up the reaction. Any suitable acid may be used, such as sulfuric acid, phosphoric acid, polyphosphoric acid, hydrochloric acid, methylsulfonic acid, p-toluenesulfonic acid, trifluoromethanesulfonic acid, and the like. The reaction may be carried out under oxygen-containing atmosphere, but an inert atmosphere is preferred. Following the reaction, the resulting oligomer may be isolated from the reaction mixture or used as is for coating a surface.

The oligomer of the present invention typically has a weight average molecular weight ($M_w$) in the range of 2000 to 100000, preferably from 2500 to 80000, more preferably from 2500 to 50000, and yet more preferably from 2500 to 30000. A particularly preferred $M_w$ range is from 5000 to 50000, and an even more preferred range is from 5000 to 30000. The molecular weight of the oligomer may be adjusted by means known to those skilled in the art. For example, longer reaction times lead to higher molecular weights. The molecular weight of the oligomer may also be controlled by adjusting the amount of the second monomer. For example, to obtain an oligomer having a $M_w$ of ≤35000, >1.05 mole of the second monomer should be used for each 1 mole of the first monomer, that is, the mole ratio of first monomer to second monomer should be at least 1:1.05, such as from 1:1.055 to 1:2.25.

While not intending to be bound by theory, it is believed that the present polyarylene oligomers are formed through the Diels-Alder reaction of the cyclopentadienone moieties of the first monomer with the ethynyl moieties of the second monomer groups upon heating. During such Diels-Alder reaction, a carbonyl-bridged species forms. It will be appreciated by those skilled in the art that such carbonyl-bridged species may be present in the oligomers. Upon further heating, the carbonyl bridging species will be essentially fully converted to an aromatic ring system. Accordingly, the resulting polyarylene oligomers of the invention possess aromatic rings having silicon atoms directly bonded thereto.

The present oligomers in the organic reaction solvent can be directly cast as a film, applied as a coating or poured into a non-solvent to precipitate the oligomer or polymer. Water, methanol, ethanol and other similar polar liquids such as glycol ethers are typical non-solvents which can be used to precipitate the oligomers. Solid oligomer may be dissolved and processed from a suitable organic solvent described above. More commonly, the oligomer is processed directly from the reaction solution and the advantages of the present invention are more fully realized in that instance. Since the oligomer is soluble in the organic solvent used as the reaction medium, the organic solution of the oligomer can be cast or applied and the solvent evaporated. It will be appreciated by those skilled in the art that the concentration of the oligomer in the organic reaction solvent may be adjusted by removing a portion of the organic solvent, or by adding more of the organic solvent, as may be desired.

In use, the composition comprising the present oligomer and organic solvent may be disposed by any suitable method on any suitable substrate surface. Suitable methods for disposing the composition include, but are not limited to, spin-coating, curtain coating, spray coating, roller coating, dip coating, and vapor deposition, among other methods. In the electronics manufacturing industry, spin-coating is a preferred method to take advantage of existing equipment and processes. In spin-coating, the solids content of the composition may be adjusted, along with the spin speed, to achieve a desired thickness of the composition on the surface it is applied to. Typically, the present compositions are spin-coated at a spin speed of 400 to 4000 rpm. The amount of the composition dispensed on the wafer or substrate depends on the total solids content in the composition, the desired thickness of the resulting coating layer, and other factors well-known to those skilled in the art.

When the present oligomer compositions are used to deposit a coating or film using certain techniques, such as spin-coating, the resulting coating may suffer from certain defects. While not wishing to be bound by theory, it is believed that such defects result from the condensation of moisture on the film surface due to evaporative cooling, and such moisture forces the oligomer out of solution, resulting in a non-uniform coating of oligomer on the surface. To address such defects, a secondary solvent, which is both water-miscible and miscible with the organic solvent used in the composition, may optionally be added to the present oligomer composition. It is believed that such secondary solvent prevents the formation of water droplets during deposition of the oligomer coating on the substrate. Such secondary solvent may be added to the present composition in any suitable amount, such as from 0 to 40 wt %, based upon the total weight of the composition, and preferably from 0 to 30 wt %. Ethyl lactate and gamma-butyrolactone are examples of such a secondary solvent.

In general, the present compositions comprise a polyarylene oligomer, an organic solvent, and one or more optional secondary solvents, as described above, wherein the oligomer is present in an amount of 1 to 35% solids, and preferably from 5 to 15% solids. Optionally, these oligomer compositions may include any suitable coating and/or curing aid, such as one or more of: surfactants (surface leveling agents); curing agents such as acids, thermal acid generators, photoacid generators, and the like; inorganic or organic fillers; adhesion promoters; viscosity modifiers; and the like. Such optional components, and the amount of such component to be used, are well known to those skilled in the art. When used, each such optional component, except for optional secondary solvents, is typically present in an amount of from 0.001 to 5 wt %. Such compositions can be used to deposit an oligomer coating on a substrate, where the oligomer coating layer has a thickness of from 50 nm to 500 µm, preferably from 100 nm to 250 µm, and more preferably from 100 nm to 100 µm. Relatively lower molecular weight ($\leq 25000$ $M_w$) oligomers of the invention are particularly useful in forming cured films having a thickness of $\leq 10$ µm, such as from 1 nm to 10 µm.

Preferably, after being disposed on a substrate surface, the oligomer composition is heated (soft baked) to remove any organic solvent present. Typical baking temperatures are from 90 to 140° C., although other suitable temperatures may be used. Such baking to remove residual solvent is typically done for approximately 30 sec. to 2 min., although longer or shorter times may suitably be used. Following solvent removal, a layer, film or coating of the oligomer on the substrate surface is obtained. Preferably, the oligomer is next cured, such as by heating to at a temperature of $\geq 300°$ C., preferably $\geq 350°$ C., and more preferably $\geq 400°$ C. Such curing step may take from 2 to 180 min., preferably from 10 to 120 min., and more preferably from 15 to 60 min., although other suitable times may be used. In one embodiment, a belt furnace may be used to cure the oligomer layer on a substrate. Such curing step may be performed in an oxygen-containing atmosphere, or in an inert atmosphere, and preferably in an inert atmosphere.

Upon curing, it is believed that the present oligomers further polymerize. Such cured, polyarylene materials possess surprising properties. For example, the variation in film thickness between a 500 nm thick uncured and cured film of the present oligomers is generally $\leq 5\%$ as measured on a 200 mm semiconductor wafer using a Thermawave™ ellipsometer. Cured films of the present oligomers typically have a low weight loss, such as $\leq 1\%$, after 60 minutes at 450° C. as determined by thermogravimetric analysis, compared to a weight loss of $>1.7\%$ for conventional polyphenylene materials under the same conditions.

An advantage of the present oligomers is that the presence of the silyl moiety enables a relatively higher degree of compatibility of these oligomers with other organic and inorganic materials, such as silicon-containing surfaces such as silicon wafers, siloxane material layers, and the like. Also, the presence of the silyl moiety in these polyarylene oligomers provides improved solubility in a variety of organic solvents. These silyl moieties also allow tuning of the surface energy of the oligomer, which can be important in various applications in the manufacture of electronic devices. Further, the present oligomers provide materials having greater flexibility, transparency, thermal stability, improved thermal expansion properties, and improved water barrier properties as compared to conventional polyphenylene oligomers. A still further advantage of the present oligomers is that the silyl moiety, which is preferably pendant to the oligomer backbone, provides an opportunity for further synthetic modification of the oligomer and polymers resulting from these oligomers. For example, when the silyl moiety is a siloxane, such moiety may be further reacted with organic alcohols or other siloxane materials. In this way, alternate crosslinking agents, that is, crosslinking agents that do not contain an alkyne or cyclopentadienone moiety, may be used with the present oligomers. Alternatively, when the silyl moiety is a siloxane, such moiety may be further reacted with water to form a silanol-containing polyarylene oligomer.

Conventional cured, crosslinked polyphenylene films do not have good adhesion to substrate surfaces and require the use of an adhesion promoter, such as that described in U.S. Pat. No. 5,668,210. Such adhesion promoter is typically applied to the substrate surface before the deposition of a layer conventional polyphenylene oligomers, which is then cured to form the crosslinked film. Surprisingly, cured films of the present oligomers, particularly present oligomers having silanol moieties, have good adhesion to substrate surfaces, such as silica, silicon nitride, FR-4, and the like, without the need to use a separate adhesion promoter, unlike conventional polyphenylene films. However, such an adhesion promoter may optionally be used, but is not required. If it is desired to use an adhesion promoter, any conventional adhesion promoter for polyphenylene films may be used, such as silanes, preferably organosilanes such as trimethoxyvinylsilane, triethoxyvinylsilane, hexamethyldisilazane [$(CH_3)_3$—Si—NH—Si$(CH_3)_3$], or an aminosilane coupler such as gamma-aminopropyltriethoxysilane, or a chelate such as aluminum monoethylacetoacetate di-isopropylate [$(i-C_3H_7O)_2Al(OCOC_2H_5CHCOCH_3)$]. In some cases, the adhesion promoter is applied from a 0.01 to 5 wt % solution, excess solution is removed, and then the polyphenylene oligomer applied. In other cases, for example, a chelate of aluminum monoethylacetoacetatedi-isopropylate, can be incorporated onto a substrate by spreading a toluene solution of the chelate on a substrate and then baking the coated substrate at 350° C. for 30 min in air to form a very thin (for example 5 nm) adhesion promoting layer of aluminum oxide on the surface. Other means for depositing aluminum oxide are likewise suitable. Alternatively, the adhesion promoter, in an amount of, for example, from 0.05 to 5 wt % based on the weight of the monomer, can be blended with the monomer before polymerization, negating the need for formation of an additional layer. Particularly suitable adhesion promoters include AP 3000, AP 8000, and AP 9000S, available from Dow Electronic Materials (Marlborough, Mass.).

The oligomers of the present invention are particularly useful in forming a relatively low dielectric constant insulating polyarylene layer on an electronic device substrate, such as in integrated circuits, circuit packaging applications, multichip modules, circuit boards, or displays. In use, a layer of a composition of the present oligomer described above is disposed on an electronic device substrate by any suitable coating method, such as those described above. The composition is then soft baked to remove residual solvent and then cured under appropriate conditions, such as those described above, to form a polyarylene film. Such soft baking step may be dispensed with if appropriate curing conditions are used, such conditions being within the skill of those practiced in the art. The resulting cured polyarylene film may be subjected to further processing steps, such as one or more of lithography, etching, metallization, drilling, ablation, dielectric film stack build-up, and the like. Cured polyarylene dielectric material produced according to the present invention may be used as is or may be combined with one or more additional dielectric materials, which may be organic or inorganic, to provide the desired insulation layer. Accordingly, the oligomers of the present invention may be used to deposit a coating on a variety of electronic device substrates, including, without limitation, FR-4, silica, silicon nitride, silicon oxynitride, silicon carbide, silicon-germanium, gallium-arsenide, indium-phosphide, aluminum nitride, alumina, and the like.

EXAMPLE 1

To a multi-neck round-bottomed flask containing a stir bar, diphenylene oxide bis(triphenylcyclopentadienone) (DPO-CPD, 2.75 g, 3.52 mmol) was added via powder funnel, followed the alkyne monomer, 1,3-bis[(trimethylsilyeethynyl]benzene (1,3-TMS-DEB, 1.00 g, 3.70 mmol) and the reaction solvent, γ-butyrolactone (GBL, 20 g, 16% solids). The reaction was stirred gently at room temperature to reach a uniform mixture. The flask was next equipped with a reflux condenser and an internal thermocouple probe attached to a self-regulating thermostat control for a heating mantle. The dark maroon contents of the flask were warmed to an internal temperature of 205° C. and maintained at this temperature for 96 hours before cooling to room temperature by removal of the heating element. The resulting deep maroon solution was transferred to a vial. Gel permeation chromatography was performed on this crude mixture, revealing a peak molecular weight distribution of $M_n$=5362 Da and $M_w$=6678 Da.

Reaction Scheme 1

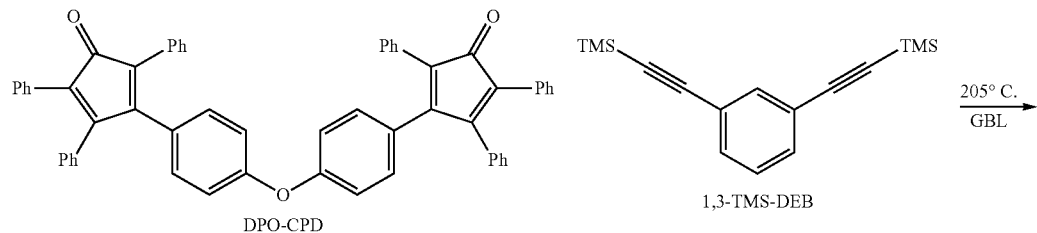

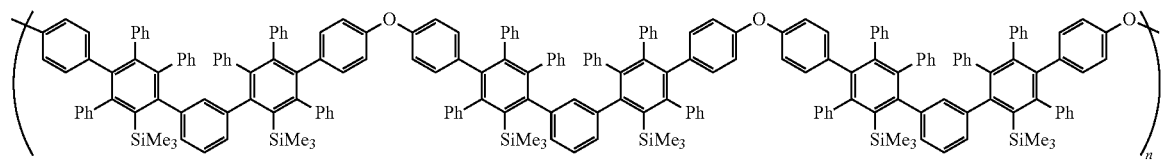

EXAMPLE 2

The Procedure of Example 1 is Repeated Except that he Solvent is Benzyl Propionate

EXAMPLE 3

To a multi-neck round-bottomed flask containing a stir bar, diphenylene oxide bis(triphenylcyclopentadienone) (2.75 g, 3.52 mmol) is added via powder funnel, followed 1,3-bis[(trimethoxylsilyl)ethynyl]benzene (1.36 g, 3.72 mmol) and the reaction solvent, N-methylpyrrolidone (25 g). The reaction is stirred gently at room temperature to reach a uniform mixture. The flask is next equipped with a reflux condenser and an internal thermocouple probe attached to a self-regulating thermostat control for a heating mantle. The contents of the flask are warmed to an internal temperature of 195° C. and maintained at this temperature for 96 hours before removal of the heating element.

EXAMPLE 4

The procedure of Example 1 is repeated except that 1,4-bis[(trimethylsilyl)ethynyl]benzene is used.

EXAMPLE 5

The procedure of Example 3 is repeated except that the second monomer is bis(phenylethynyl)dimethylsilane (0.95 g, 3.65 mmol) and the solvent is benzyl propionate.

EXAMPLE 6

The procedure of Example 3 is repeated except that the solvent is GBL. After the reaction is complete, the oligomer is hydrolyzed with DI water (40 mole %, based on the moles of 1,3-bis[(trimethoxylsilyl)ethynyl]benzene monomer used) in the presence of a catalytic amount of acid, to provide an oligomer containing silanol moieties.

EXAMPLE 7

The procedure of Example 1 is repeated except that 2.5 mmol of 1,3-bis[(trimethylsilyl)ethynyl]benzene is used along with 1.2 mmol of 1,3-diethynylbenzene.

EXAMPLE 8

The procedure of Example 1 is repeated except that 2.75 mmol of 1,3-bis[(trimethylsilyl)ethynyl]benzene is used along with 1 mmol of 1,2,4-tris(phenylethynyl)benzene.

EXAMPLE 9

The procedure of Example 5 is repeated except that the second monomer is 1,3,5-tris(trimethylsilylethynyl)benzene (3.2 mmol).

EXAMPLE 10

A film of the oligomer from Example 1 is formed on a 200 mm semiconductor wafer by spin-coating using a spin speed of 1000 rpm for 90 sec. The coated film is then baked at 110° C. for 60 sec. to remove any residual solvent. Next, the oligomer film is cured in a belt furnace under $N_2$ using the following programmed temperature sequence: 250° C.-300° C.-400° C. (4 zones)—300° C.-250° C., with 7.5 min. for each zone, resulting in a cured polyphenylene film.

EXAMPLE 11

The procedure of Example 10 is repeated except that the hydrolyzed oligomer of Example 6 is used.

What is claimed is:

1. An arylene oligomer comprising as polymerized units a first monomer having two cyclopentadienone moieties and a second monomer having two or more alkyne moieties, wherein at least one alkyne moiety is directly bonded to a silicon atom, and wherein the second monomer is chosen from formula (5) and formula (6)

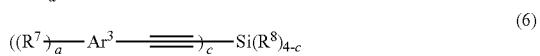

wherein a is an integer from 0 to 4; b is 2 or 3; c is 2 or 3; each $R^6$ is independently chosen from H, $Si(R^8)_3$, $C_{1-10}$ alkyl, $C_{1-10}$ alkoxy, $C_{7-15}$ aralkyl, $C_{6-10}$ aryl, and substituted $C_{6-10}$ aryl; each $R^7$ is independently chosen from H, $C_{1-10}$ alkyl, $C_{1-10}$ alkoxy, $C_{7-15}$ aralkyl, $C_{6-10}$ aryl, and substituted $C_{6-10}$ aryl, each $R^8$ is independently chosen from H, halogen, hydroxyl, $C_{1-10}$ alkyl, $C_{1-10}$ alkoxy, $C_{7-15}$ aralkyl, $C_{7-15}$ aralkoxy, $C_{6-10}$ aryl, $C_{6-20}$ aryloxy, and substituted $C_{6-10}$ aryl; and $Ar^3$ is $C_{6-10}$ carbocyclic aryl; provided that at least one $R^6$ is $Si(R^8)_3$.

2. The arylene oligomer of claim 1 wherein the first monomer has the formula

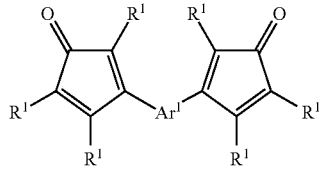

wherein each $R^1$ is independently chosen from H, phenyl, or substituted phenyl; and $Ar^1$ is an aromatic moiety.

3. The arylene oligomer of claim 2 wherein each $R^1$ is phenyl.

4. The arylene oligomer of claim 1 wherein each $R^8$ is independently chosen from H, hydroxyl, $C_{1-6}$ alkyl, $C_{1-6}$ alkoxy, $C_{7-12}$ aralkyl, $C_{7-15}$ aralkoxy, $C_{6-10}$ aryl, $C_{6-15}$ aryloxy, and substituted $C_{6-10}$ aryl.

5. The arylene oligomer of claim 4 wherein each $R^8$ is independently chosen from H, hydroxyl, methyl, ethyl, propyl, butyl, methoxy, ethoxy, propoxy, butoxy, phenyl, benzyl, phenethyl, and phenoxy.

6. A composition comprising the arylene oligomer of claim 1 and an organic solvent.

7. The composition of claim 6 wherein the organic solvent is chosen from benzyl esters of $C_{2-6}$ alkanecarboxylic acids, dibenzyl esters of $C_{2-6}$ alkanedicarboxylic acids, tetrahydrofurfuryl esters of $C_{2-6}$ alkanecarboxylic acids, ditetrahydrofurfuryl esters of $C_{2-6}$ alkanedicarboxylic acids, phenethyl esters of $C_{2-6}$ alkanecarboxylic acids, diphenethyl esters of $(C_2-C_6)$alkanedicarboxylic acids, cycloalkanones and aromatic solvents.

8. The composition of claim 7 further comprising a water-miscible solvent.

9. A method of preparing the arylene oligomer of claim 1 comprising reacting a first monomer having two cyclopentadienone moieties with a second monomer having two or more alkyne moieties, wherein at least one alkyne moiety is directly bonded to a silicon atom.

10. An electronic device comprising a polymeric layer formed from the arylene oligomer of claim 1.

11. A method of manufacturing an electronic device comprising: providing an electronic device substrate; disposing a layer of the composition of claim 6 on the electronic device substrate; curing the composition to form a cured polyarylene film on the electronic device substrate; and subjecting the cured polyarylene film to one or more of lithography, etching, metallization, drilling, ablation, and dielectric film stack build-up.

12. The arylene oligomer of claim 1 wherein the second monomer is chosen from 1,3-bis[(trimethylsilyl)ethynyl]benzene, 1,4-bis[(trimethylsily)ethynyl]benzene, 1,3,5-tris(trimethylsilylethynyl)benzene, 1,3-bis[(trimethoxysilyl)ethynyl]benzene, 1,4-bis[(trimethoxysily)ethynyl]benzene, 1,3-bis[(dimethylmethoxysilyl)ethynyl]benzene, 1,4-bis[(dimethylmethoxysily)ethynyl]benzene, 1,3-phenylenebis(ethyne-2,1-diyl))bis(dimethylsilanol), 1,4-phenylenebis(ethyne-2,1-diyl))bis(dimethylsilanol), bis(phenylethynyl)dimethylsilane, and bis(phenylethynyl)dimethoxysilane.

13. The arylene oligomer of claim 1 wherein $Ar^3$ is phenyl or naphthyl.

14. The arylene oligomer of claim 2 wherein $Ar^1$ is an aromatic moiety having the structure shown of formula (2)

wherein x is an integer chosen from 1, 2 or 3; y is an integer chosen from 0, 1or 2; each $Ar^2$ is independently chosen from

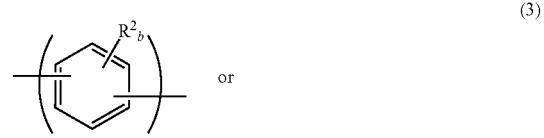

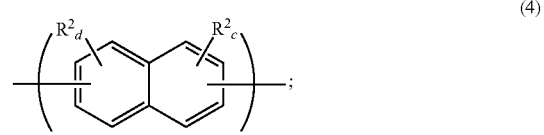

each $R^2$ is independently chosen from halogen, $C_{1-6}$ alkyl, $C_{1-6}$ haloalkyl, $C_{1-6}$ alkoxy, $C_{1-6}$ haloalkoxy, phenyl, and phenoxy; b is an integer from 0 to 4; each of c and d is an integer from 0 to 3; each Z is independently chosen from O, S, SO, $SO_2$, $NR^3$, $PR^3$, $P(=O)R^3$, $C(=O)$, $CR^4R^5$, and $SiR^4R^5$; $R^3$, $R^4$, and $R^5$ are independently chosen from H, $(C_1-C_4)$alkyl, halo$(C_1-C_4)$alkyl, and phenyl.

* * * * *